W. SCHOENECKER.
DRAFT EQUALIZER.
APPLICATION FILED DEC. 17, 1909.

964,319.

Patented July 12, 1910.
2 SHEETS—SHEET 1.

Witnesses:—
Joe. P. Waller.
E. M. Ricketts

Inventor
William Schoenecker
By Watson E. Coleman
Attorney

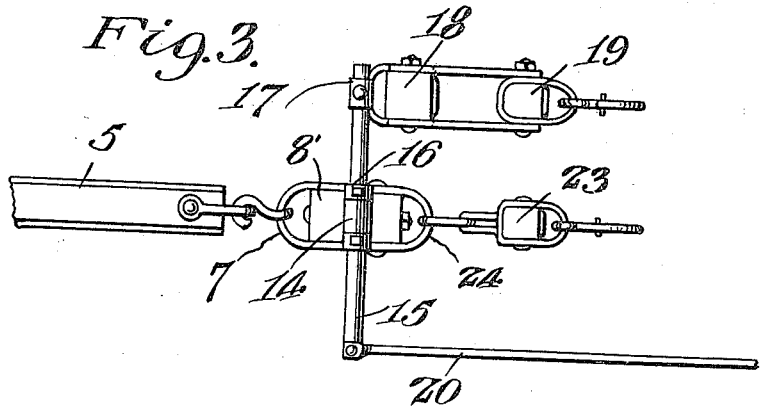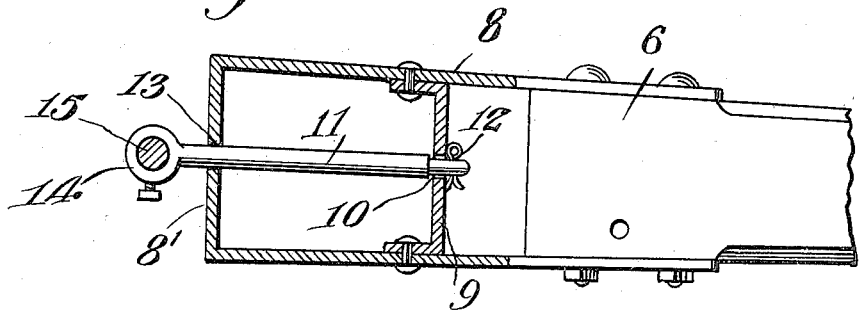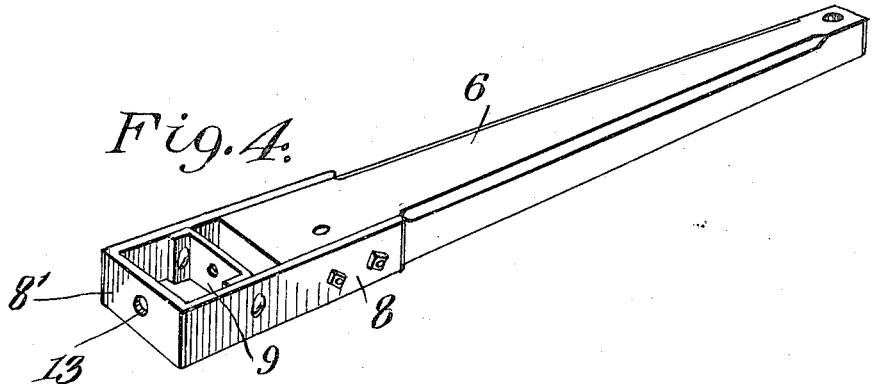

UNITED STATES PATENT OFFICE.

WILLIAM SCHOENECKER, OF KENMARE, NORTH DAKOTA.

DRAFT-EQUALIZER.

964,319.   Specification of Letters Patent.   Patented July 12, 1910.

Application filed December 17, 1909. Serial No. 533,690.

*To all whom it may concern:*

Be it known that I, WILLIAM SCHOENECKER, a citizen of the United States, residing at Kenmare, in the county of Ward and State of North Dakota, have invented certain new and useful Improvements in Draft-Equalizers, of which the following is a specification, reference being had to the accompanying drawings.

This invention relates to certain new and useful improvements in draft equalizers and more particularly to a device of this character which is especially adapted for equalizing the draft upon plow teams, and to efficiently equalize the draft of the team where four or more draft animals are used.

Another object is to provide a very simple draft equalizer which is highly efficient in its operation and may be produced at a minimum expenditure.

With these and other objects in view, the invention consists of the novel features of construction and the combination and arrangement of parts hereinafter fully described and claimed, and illustrated in the accompanying drawings, in which—

Figure 1:
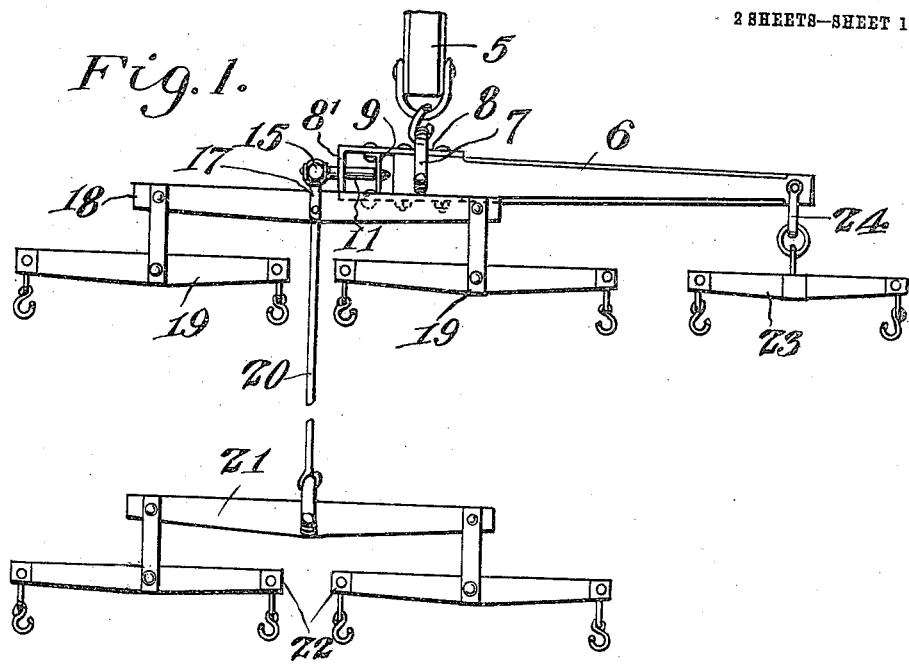
Figure 2:
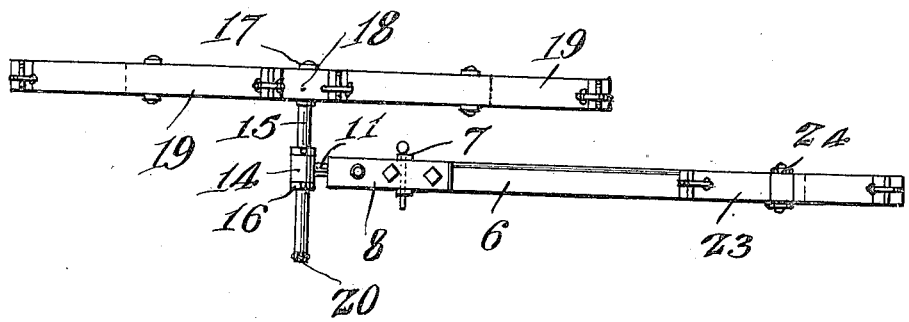

Figure 1 is a top plan view of a draft equalizer constructed in accordance with the present invention; Fig. 2 is a front elevation thereof; Fig. 3 is a side elevation; Fig. 4 is a detail perspective view of the main draft bar; and Fig. 5 is an enlarged detail section of the equalizing device.

Referring to the drawings 5 indicates the tongue of a plow or other vehicle to which is attached my improved draft equalizer. The equalizer comprises the main draft bar 6 which is pivotally mounted upon the end of the vehicle beam by means of the clevis 7. To the inner end of the bar 6 a metallic U-shaped bar or yoke 8 is secured. This U-shaped bar extends beyond the end of the bar 6, the transverse connecting portion 8' thereof being disposed in parallel relation and spaced from the end of the draft bar. Within the space thus provided and secured at its ends to the opposite sides of the bar 8 is a transverse connecting member 9. This member is provided with a central opening in which the reduced shank 10 of an eye bolt 11 is loosely mounted. Through the extremity of this shank the cotter pin 12 is disposed and securely retains the eye bolt in the frame bar 8. The transverse connecting portion 8' of the frame bar is also provided with a central opening 13 through which the eye bolt 11 is disposed and has free rotative movement.

The outer end of the bolt is formed with the eye 14. Through this eye the rod or standard 15 is loosely disposed and is retained therein by means of the collars or flanges 16 which are carried by the rod 15 and are disposed against the opposite faces of the eye 14 of the bolt 11. These collars are held in position upon the bolt by means of suitable set screws which extend therethrough and bind upon the same. To the upper end of the rod 15 a U-shaped yoke or clevis 17 is attached and embraces the doubletree bar 18, the whiffletrees 19 being secured to each end thereof. To the lower end of the rod or standard 15 one end of the rod 20 is attached and extends forwardly in advance of the rear team of draft animals. A second doubletree 21 is secured to the forward end of this rod and carries the whiffletrees 22 to which the draft animals are attached. Thus the rear team may be first arranged upon opposite sides of the forwardly extending rod 20 and properly attached to the whiffletrees 19 and the advance or lead team then attached to the forward whiffletrees 22. Upon the other end of the draft bar 6 a swingletree 23 is attached by means of the clevis 24. To this swingle-tree a single animal is attached and in the operation of the device this arrangement of the animals will effectively equalize the work or strain upon each of them and their full pulling power will be attained without placing upon them undue strain. In case it is desired to attach two additional draft animals by the side of the rear team, this may be done by attaching a double tree to the clevis 24, said double tree carrying a swingle tree at each end thereof similar to the swingle-trees 19. The attachment of the draft bar 6 to the end of the beam 5 will of course be adjusted by moving the same to the left, and attaching the clevis 7 thereto at a point nearer to the opposite end of the bar 6 than that shown in Fig. 1, so that the draft upon the animals will thereby be equalized. If four animals are desired in both front and rear, the arrangement of the frame 8 and eye bolt 11 together with the front and rear double trees and swingle trees is duplicated upon the opposite end of the draft bar, and the attaching clevis moved to the center of the beam.

By the arrangement above described it will be obvious that the horses or other animals are much closer to the load being drawn than in devices of a similar character as heretofore constructed. There are no loose parts which will interfere with the proper operation of the device, and it is impossible for one of the horses to obtain any advantage over the others. It is possible, however, by simple adjustment of the parts to give to one or more of the animals a certain advantage in draft over the others in accordance with the difference in the pulling powers of the animals.

From the foregoing it will be seen that I have provided a draft equalizing attachment which is especially adapted for heavy work such as plowing and other field work and one which will be very efficient in operation and may be constructed at a very low cost.

While I have shown and described what I believe to be the preferred embodiment of the invention, it will be understood that numerous minor modifications may be resorted to without departing from the spirit or sacrificing any of the advantages thereof.

Having thus described the invention what is claimed is:

A draft equalizer comprising a frame adapted to be attached to one end of a draft bar, an eye bolt rotatably mounted and longitudinally positioned in said frame with relation to the draft bar, a rotatable rod disposed in the eye of said bolt, adjustable collars on said rod disposed on opposite sides of the eye and adapted to prevent vertical movement of the rod, a doubletree secured to the upper end of said rod, a swingletree secured to the opposite end of the draft bar, a doubletree disposed in advance of the draft bar, and a single rigid connection between said doubletree and the lower end of the rotatable rod, said eye bolt providing a central pivot for said rod, whereby the same may oscillate, and also permitting of its free rotation, whereby the doubletrees may move in a horizontal plane.

In testimony whereof I hereunto affix my signature in the presence of two witnesses.

WILLIAM SCHOENECKER.

Witnesses:
    PERCY M. CLARK,
    J. G. WEBSTER.